United States Patent
Uba

(10) Patent No.: US 9,716,790 B2
(45) Date of Patent: Jul. 25, 2017

(54) COMMUNICATIONS BETWEEN CONTACT CENTER AGENT SYSTEMS TO FACILITATE AGENT ENGAGEMENT

(71) Applicant: Avaya Inc., Basking Ridge, NJ (US)

(72) Inventor: Gene M. Uba, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/814,772

(22) Filed: Jul. 31, 2015

(65) Prior Publication Data

US 2017/0034349 A1 Feb. 2, 2017

(51) Int. Cl.
- *H04M 3/00* (2006.01)
- *H04M 5/00* (2006.01)
- *H04M 3/51* (2006.01)
- *H04M 3/523* (2006.01)

(52) U.S. Cl.
CPC ......... *H04M 3/5175* (2013.01); *H04M 3/523* (2013.01); *H04M 3/5166* (2013.01); *H04M 2203/404* (2013.01); *H04M 2203/406* (2013.01)

(58) Field of Classification Search
CPC ......... H04M 3/5175; H04M 2203/401; H04M 2203/402; H04M 3/2227; H04M 3/523

USPC ........... 379/265.04, 265.03, 265.05, 265.11, 379/265.01, 219

See application file for complete search history.

(56) References Cited

U.S. PATENT DOCUMENTS

| | | | |
|---|---|---|---|
| 5,144,653 A * | 9/1992 | Masuoka | H04M 3/523 379/111 |
| 8,699,696 B1 * | 4/2014 | Steiner | H04M 3/5233 379/265.02 |
| 9,357,058 B2 * | 5/2016 | Davis | H04M 3/38 |
| 2007/0198284 A1 * | 8/2007 | Korenblit | G06Q 10/06 705/7.42 |
| 2014/0270135 A1 * | 9/2014 | Odinak | H04M 3/5175 379/265.03 |

* cited by examiner

*Primary Examiner* — Thjuan K Addy

(57) ABSTRACT

Embodiments disclosed herein provide systems, methods, and computer readable media for facilitating engagement with a plurality of agents in a contact center. In a particular embodiment, a method provides detecting a log-in/out event for a first agent of the plurality of agents operating a first agent system of a plurality of agent systems to a communication distribution system configured to distribute communications with the contact center among the plurality of agent systems. In the communication distribution system, the method provides determining that the first agent system should communicate with a second agent system of the plurality of agent systems and initiating a first communication between the first agent system and the second agent system.

20 Claims, 6 Drawing Sheets

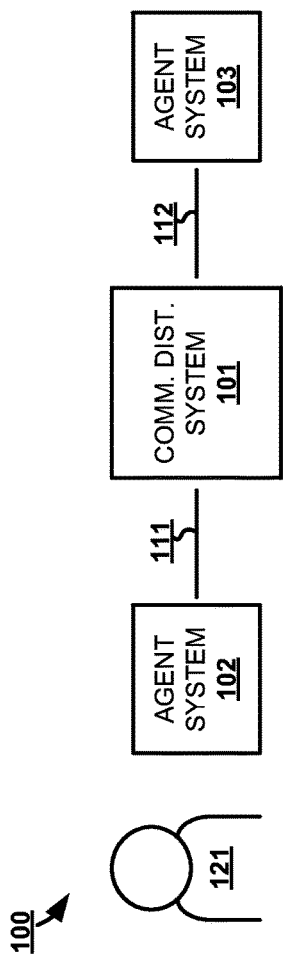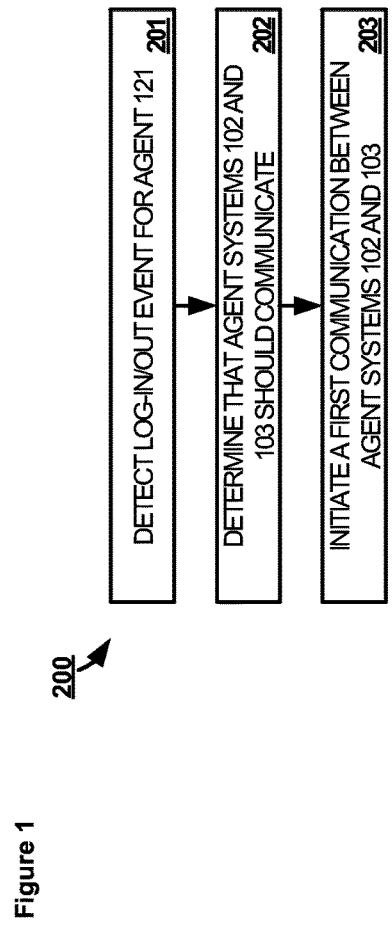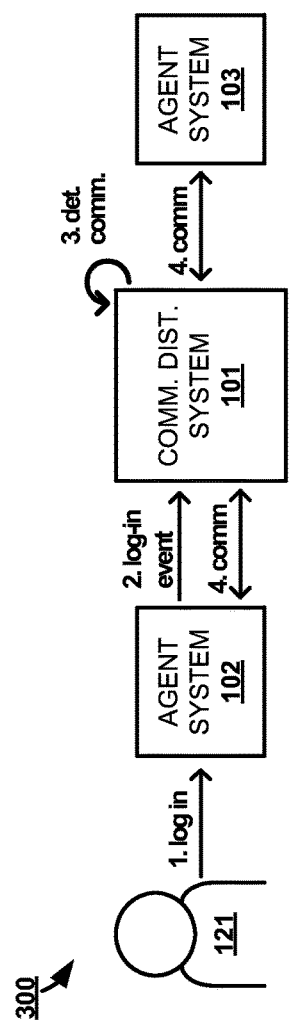

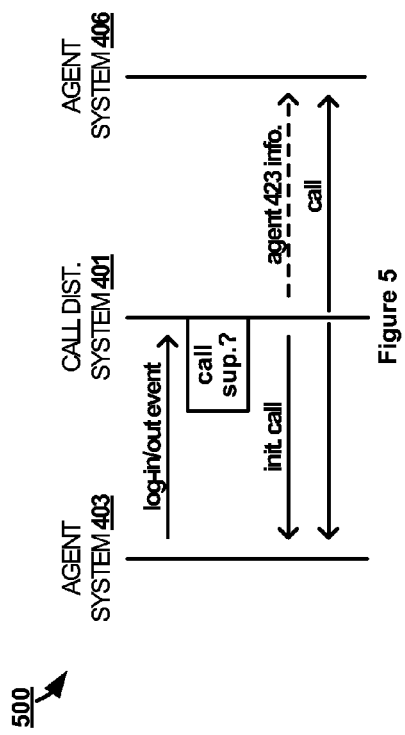
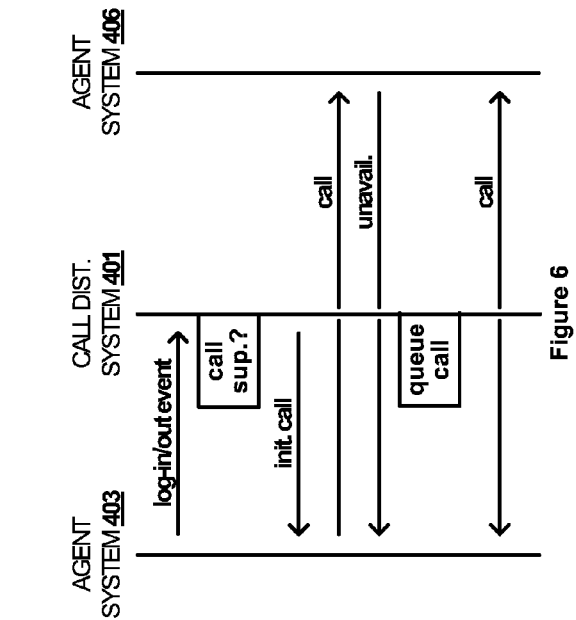

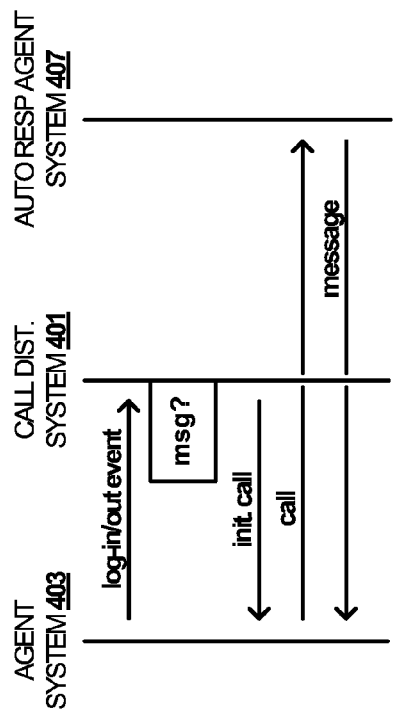
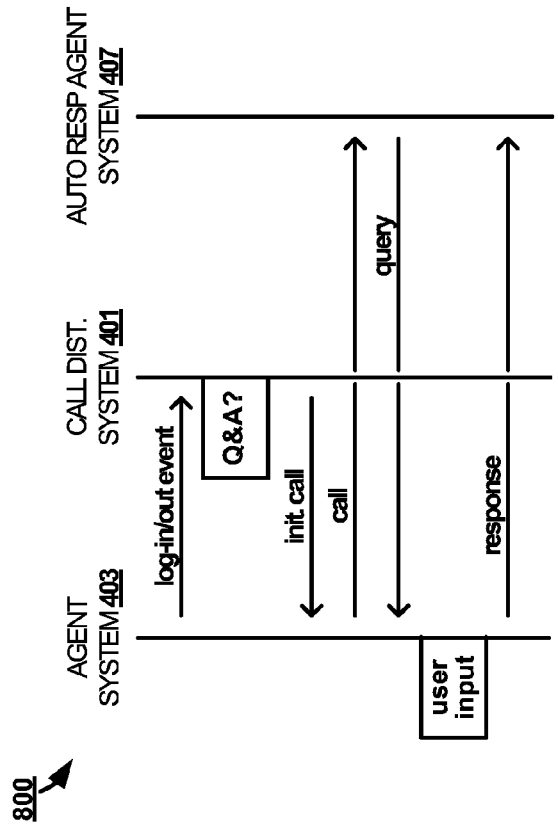

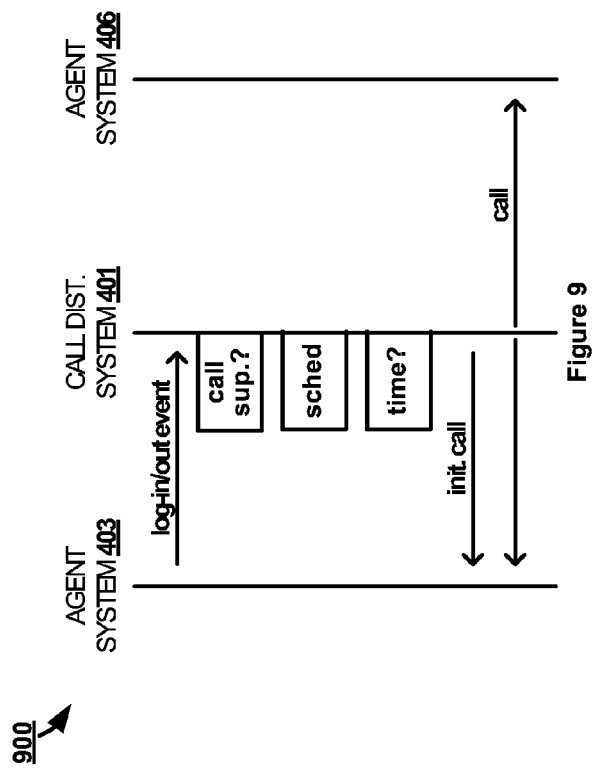

COMMUNICATIONS BETWEEN CONTACT CENTER AGENT SYSTEMS TO FACILITATE AGENT ENGAGEMENT

TECHNICAL FIELD

Aspects of the disclosure are related to communications between contact center agent systems and, in particular, to ensuring communications occur between two or more agent systems.

TECHNICAL BACKGROUND

A contact center is staffed by agents that represent one or more entities associated with the contact center. The contact center may be part of the entity, owned by the entity, owned by a third party under contract with the entity, or in some other arrangement with the entity. The agents may provide sales support, provide technical support, facilitate a survey, or perform some other function with people outside of the contact center (e.g. customers of the entity). When a customer calls into a call center (e.g. by dialing an 800 number), a call distribution system typically routes the customer to an agent of the call center and, if necessary, will queue the customers call before it reaches the selected agent.

In many cases, partly due to the automation that a call distribution system provides to the contact center, many agents can make it through entire shifts working at the contact center without interacting with a supervisor. Thus, during those times, the supervisor has not had the chance to speak with the agent about goals for the contact center, the agent's performance in the contact center, or any other reason that a supervisor may want to speak with the agents. Conversely, the agent has not had the chance to ask the supervisor questions, air concerns that the agent may have, or any other reason that an agent may want to speak with a supervisor. This lack of communication with the agents may lead to high turn over at the contact center or otherwise inhibit the contact center agents from working to their potential.

OVERVIEW

Embodiments disclosed herein provide systems, methods, and computer readable media for facilitating engagement with a plurality of agents in a contact center. In a particular embodiment, a method provides detecting a log-in/out event for a first agent of the plurality of agents operating a first agent system of a plurality of agent systems to a communication distribution system configured to distribute communications with the contact center among the plurality of agent systems. In the communication distribution system, the method provides determining that the first agent system should communicate with a second agent system of the plurality of agent systems and initiating a first communication between the first agent system and the second agent system.

In some embodiments, initiating the first communication occurs responsive to the detecting the log-in/out event and before any of the communications with the contact center are distributed to the first agent system.

In some embodiments, the method further provides, upon ending the first communication, connecting a first incoming communication of the communications with the contact center to the first agent system.

In some embodiments, determining that the first agent system should communicate with the second agent system comprises scheduling times for a second agent of the plurality of agents operating the second agent system to communicate with each other agent of the plurality of agents.

In some embodiments, initiating the first communication occurs at a time scheduled for the first agent to communicate with the second agent.

In some embodiments, after initiating the first communication, the method provides determining that the second agent system is currently unavailable and, responsively, placing the first communication in a queue for the second agent system.

In some embodiments, the method provides transferring a pre-recorded message from the second agent system to the first agent system over the first communication for presentation to the first agent by the first agent system.

In some embodiments, the second agent system comprises an interactive response system. In those embodiments, the method further provides transferring queries from the second agent system to the first agent system for presentation to the first agent by the first agent system and, in the second agent system, receiving responses to the queries from the first agent system, wherein the responses are based on user input from the first agent into the first agent system.

In some embodiments, the method provides transferring information regarding the first agent to the second agent system for presentation to a second agent of the plurality of agents operating the second agent system in response to initiating the first communication.

In some embodiments, recording information regarding an interaction between the first agent and a second agent of the plurality of agents operating the second agent system that occurs over the first communication.

In another embodiment, a communication distribution system is provided including a processing system and a communication interface. The processing system is configured to detect a log-in/out event for a first agent of a plurality of agents operating a first agent system of the plurality of agent systems to the communication distribution system and determine that the first agent system should communicate with a second agent system of the plurality of agent systems. The communication interface is configured to initiate a first communication between the first agent system and the second agent system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a contact center environment for facilitating engagement with a plurality of agents in a contact center.

FIG. 2 illustrates a method of operating the contact center environment to facilitate engagement with a plurality of agents in a contact center.

FIG. 3 illustrates an example operational scenario of the contact center environment for facilitating engagement with a plurality of agents in a contact center.

FIG. 5 illustrates an operational scenario of the contact center environment for facilitating engagement with a plurality of agents in a contact center.

FIG. 6 illustrates an operational scenario of the contact center environment for facilitating engagement with a plurality of agents in a contact center.

FIG. 7 illustrates an operational scenario of the contact center environment for facilitating engagement with a plurality of agents in a contact center.

FIG. 8 illustrates an operational scenario of the contact center environment for facilitating engagement with a plurality of agents in a contact center.

FIG. 9 illustrates an operational scenario of the contact center environment for facilitating engagement with a plurality of agents in a contact center.

FIG. 10 illustrates an agent schedule for facilitating engagement with a plurality of agents in a contact center.

TECHNICAL DISCLOSURE

Figure 4:
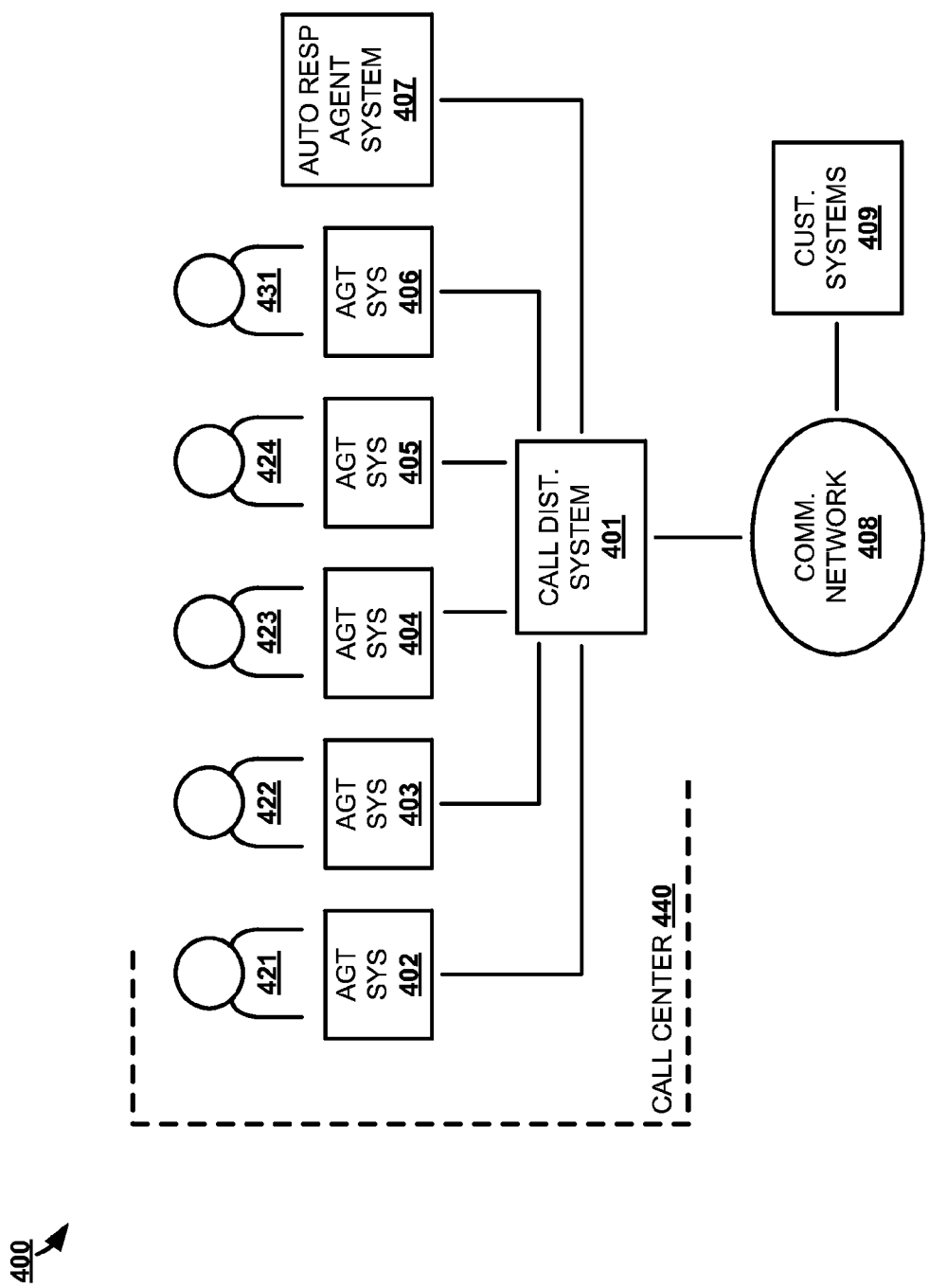
FIG. 4 illustrates a contact center environment for facilitating engagement with a plurality of agents in a contact center.

Contact centers may be used for a variety of purposes for communications on behalf of one or more entities represented by agents at the contact center. For example, agents at a contact center may handle sales or technical support calls from customers of a company represented by the agents. Typically, when a person communicates with a contact center, the communication is routed to an agent that can assist the person. Before the communication is serviced by the agent, the communication may be placed in a call queue, the person may be queried about the reasons for initiating the communication, or some other process may be performed on the communication to ensure proper handling of the communication. In some cases, contact centers may route communications out from an agent, as may be the case in a telemarketing contact center or any other type of contact center that would have reason for agents to reach out. Many different types of logic may be used to determine which agent should handle both communications incoming or outgoing from a contact center. In one example, call vectoring is a set of instructions used by contact center to indicate to which agent or groups of agents a call to or from the contact center should be routed. In a more basic example, calls may simply be routed to the next available agent.

A communication distribution system of some kind is tasked with handling the routing of communications to and from a contact center, as discussed above. However, the communication distribution system described below is configured to also route communications between agents of a contact center. Specifically, like a communication from outside a contact center may be automatically directed by a communication distribution system to a particular agent, the communication distribution system may automatically route a call from one agent to another. For example, instead of being routed a communication from outside of the contact center to an agent, a communication may be directed from the agent to the agent's supervisor. This essentially forces the agent to communicate with their supervisor. The supervisor can then engage the agent in communications that may not have otherwise happened. Communications such as these with the supervisor may allow the supervisor to ensure everything is going well with the agent, answer any questions the agent may have, set forth productivity goals to the agent, provide general guidance, or discuss anything else that the supervisor or agent deems appropriate. Had the communications not occurred, the contact center may not have operated as well as if they did.

FIG. 1 illustrates contact center environment 100 in an operational scenario for facilitating engagement with a plurality of agents in a contact center. Contact center environment 100 includes communication distribution system 101, agent system 102, and agent system 103. Agent 121 is operating agent system 102. Agent system 102 and communication distribution system 101 communicate over communication link 111. Agent system 103 and communication distribution system 101 communicate over communication link 112.

In this embodiment, communication distribution system 101 distributes incoming communications to agents of a contact center by way of each agent's agent system, which may be a personal computer, smartphone, tablet, or other type of computing device. Communication distribution system 101 may further handle communication queuing if one or more agents selected to handle a communication are unavailable, communication transfer from one agent to another, or some other function typical of a communication distribution system. The communications handled by communication distributions system 101 may be voice, video, text, packet based, circuit switched, or any other type of communications.

FIG. 2 illustrates a method 200 for operating contact center environment 100 in an example scenario of facilitating engagement with a plurality of agents in a contact center. Method 200 provides detecting a log-in/out event for agent 121 operating agent system 102 to communication distribution system 101, which is configured to distribute communications with the contact center among agent systems (step 201). The log-in/out event may comprise agent 121 logging into system 101 via agent system 102 to indicate that agent 121 is ready to accept communications from system 101, agent 121 logging out of system 101 via agent system 102 at the end of the agent's shift or otherwise, agent 121 indicating that they are going on break via agent system 102, agent 121 indicating that they are back from a break via agent system 102, or any other event related to agent 121 informing communication distribution system 101 whether they are able to accept communications. In some examples, agent 121 may dial a call into communication distribution system 101 using agent system 102. Once the call is connected, the log-in/out event may occur when agent 121 uses a keypad on agent system 102 to provide agent credentials, indicate when agent 121 is ready to accept calls, or provide other information to communication distribution system 101.

Method 200 further provides communication distribution system 101 determining that agent system 102 should communicate with agent system 103 (step 202). Communication distribution system 101 may determine that agent systems 102 and 103 should communicate because an agent operating agent system 103 is a supervisor in charge of at least agent 121. This would therefore allow the supervisor to communicate with agents under their charge. In other examples, agent system 103 may be operated by another type of agent, including a peer agent to agent 121, or may be a system configured to deliver preset messages to other agent systems.

In some examples, communication distribution system 101 may be configured to determine that agent systems 102 and 103 should communicate as soon as agent 121 logs in through agent 102 and before any calls external to the contact center are routed to agent system 102. This determination may be unique to agent system 102 or may be true for multiple agent systems at the contact center. In those latter cases, multiple agents logging in at the same time may cause conflicts when attempting to communicate with agent system 103. Thus, communication distribution system 101 may use a queue to manage communications with agent system 103, may route external communications to waiting agent systems while waiting for agent system 103 to become available, or may use some other method for managing multiple communications to a single agent system.

One way to preempt conflicts caused by multiple agent systems communicating with agent system 103 is for communication distribution system 101 to schedule a time during step 202 when agent 121 via agent system 102 should communicate with agent system 103. The schedule may include and account for times when agents other than agent 121 are to communicate with agent system 103. Moreover, communication distributions system 101 may account for each individual agent's personal schedule when determining times for each agent (e.g. when each agent is scheduled to go on break, has a meeting scheduled, or otherwise). Thus, communication conflicts can be avoided by scheduling agent systems to ensure conflicts do not occur.

In some embodiments performing the above examples, the queueing and scheduling capabilities may be performed by Computer Telephony Interface (CTI) applications executing on communication distribution system 101. Regarding communications between agent systems and systems external to the call center, the CTI applications may be capable of scheduling call backs, redirecting communications to a messaging system, and queueing communications, among other features. These same external communication handling functionalities may be repurposed to handle internal calls between agent systems in the manner described above.

Once communication distribution system 101 makes the determination at step 202, method 200 provides system 101 initiating a first communication between agent system 102 and agent system 103 (step 203). Communication distribution system 101 may initiate the first communication by instructing agent system 102 to communicate with agent system 103, instructing agent system 103 to communicate with agent system 102, establishing a communication to each of agent systems 102 and 103 and then bridging the two communications together, or by some other means. In some examples, the same process used to direct communications between agent systems and systems external to the contact center may be used to initiate the communications between agent systems 102 and 103. For example, call vectoring comprises a set of instructions programmed into communication distribution system 101. These instructions direct communication distribution system 101 on how to handle communication routing between agent systems and systems outside of the contact center. To perform communication routing between agent systems as described herein, the call vectoring instructions may be added to or amended in order to route communications between two agent systems. Communication distributions system 101 therefore controls, via agent system 102, when agent 121 is to communicate with agent system 103 and can ensure communications occur with agent 121 when agent 121 may otherwise remain isolated.

FIG. 3 illustrates an operational scenario 300 for contact center environment 100 to facilitate engagement with a plurality of agents in a contact center. At step 1, agent 121 logs into agent system 101. To log in, agent 121 may provide a user ID and password, biometric information, such as a fingerprint, voice recognition, or any other type of information that agent system 102 and communication distribution system 101 may use to authenticate agent 121. At step 2, communication distribution system 101 either takes part in the authentication of agent 121 to log in agent 121 or may simply be notified that agent 121 has logged in to register a log-in event.

Upon detecting the log-in event, communication distribution system 101 determines that agent 121 should communicate with agent system 103 via agent system 102 at step 3. In this example, upon making the determination that systems 102 and 103 should communicate, communication distribution system 101 initiates a communication between agent systems 102 and 103 at step 4. While the communication is shown to be routed through communication distribution system 101 in this example, the communication does not necessarily need to be routed through system 101. The communication carries voice, video, text, or other type of user communications to and/or from agent system 102. If agent system 103 is operated by an agent, then the communication may include real-time communications between that agent and agent 121. Alternatively, if agent system 103 is an automated response system, then agent system 103 interacts with agent 121 in real-time on its own (e.g. by playing a prerecorded message, presenting queries to agent 121 and receiving responses, or other type of automated communication).

In the above example, agent 121 is forced to communicate with agent system 103 before handling any communications from outside the contact center since agent system 102 communicates with agent system 103 upon agent 121 logging in. This communication ensures that agent 121 receives information from agent system 103. In other examples, the communication may occur in response to another type of log-in/out event. For instance, agent 121 may instruct agent system 102 to log out at the end of agent 121's shift but before communication distribution system 101 logs agent 121 out, system 101 may initiate a communication between agent systems 102 and 103. This allows for communication with agent 121 before agent 121 leaves the contact center for the day.

In some examples, communication distribution system 101 may record at least part of the communication between agent systems 102 and 103 and/or information related to the communication (e.g. duration, parties involved, etc.). The recording may be stored on a storage system (e.g. hard disk, flash memory, magnetic tape, optical disc, etc.) located within communication distribution system 101 or external to communication distributions system 101 (e.g. network attached storage, an administrator's workstation, etc.). Recorded communications can then be analyzed at a later time by human or computing resources. For example, the communications can be reviewed for topics that concern agents so that supervisors can address those topics with the contact center as a whole. In other examples, from the recorded communication information may assist a contact center administrator when making staffing decisions, such as not scheduling agents that fail to satisfy engagement requirements (e.g. information indicates that the agent disconnects a call before a message is done playing).

Referring back to FIG. 1, communication distribution system 101 comprises a computer processor system and communication interface for distributing communications between a plurality of agent systems. Communication distribution system 101 may also include other components such as a router, server, data storage system, and power supply. Communication distribution system 101 may reside in a single device or may be distributed across multiple devices. While shown separately, the functionality of communication distribution system 101 may be incorporated into one or more of agent systems 102 and 103. Communication distribution system 101 may be a communication server, conferencing system, application server, private branch exchange, personal computer workstation, network gateway system, or some other computing system—including combinations thereof.

Agent systems 102 and 103 each comprise a computer processor system and communication interface. Agent systems 102 and 103 may also include other components such as a router, server, data storage system, and power supply. Agent systems 102 and 103 may each reside in a single device or may be distributed across multiple devices. Alternatively, client 103 may be a more traditional videoconferencing client without the view control functionality. Agent systems 102 and 103 may be a telephone, computer, tablet, e-book, mobile Internet appliance, network interface card, media player, game console, application server, proxy server, or some other communication apparatus—including combinations thereof.

Communication network 104 comprises network elements that provide communications services. Communication network 104 may comprise switches, wireless access nodes, Internet routers, network gateways, application servers, computer systems, communication links, or some other type of communication equipment—including combinations thereof. Communication network 104 may be a single network (e.g. local area network, wide area network, the Internet, etc.) or may be a collection of networks.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

FIG. 4 illustrates contact center environment 400 in an operational scenario for facilitating engagement with a plurality of agents in a contact center. Contact center environment 400 includes call distribution system 401, agent systems 402-407, communication network 408, and one or more customer systems 409. Call distribution system 401 and agent systems 402-407 are part of call center 440. Agents 421-424 operate agent systems 402-405, respectively. Supervisor agent 431 operates agent system 406. Agent system 407 is an automated response agent system.

Communication network 408 comprises network elements that provide communications services. Communication network 408 may comprise switches, wireless access nodes, Internet routers, network gateways, application servers, computer systems, communication links, or some other type of communication equipment—including combinations thereof. Communication network 408 may be a single network (e.g. local area network, wide area network, the Internet, etc.) or may be a collection of networks. While systems 401-407 are illustrated as communicating with direct links, communication network 408 or another communication network may be employed for communications between systems 401-407.

In operation, agents 421-424 and supervisor agent 431 are employed by call center 440 to represent an entity associated with call center 440 to customers, or potential customers, of the entity. Supervisor agent 431 is in charge of agents 421-424. Customers use customer systems 409 to communicate with call center 440. Customer systems 409 may be telephones, computers, tablets, or any other type of device that a customer may operate to communicate with call center 440. Call center 440 may be at a single location or may be distributed across multiple locations. Call distribution system 401 handles the distribution of calls (video or voice) with customer systems 409 among agents 421-424 and 431. The calls may be incoming or outgoing from contact center 440.

FIG. 5 illustrates an operational scenario 500 for contact center environment 400 to facilitate engagement with a plurality of agents in a contact center. This example and the examples below all focus on agent system 403 operated by agent 422, although, the same teachings apply to any of agent systems 401-405 and their respective agents 421-424. Call distribution system 401 detects a log-in/out event from agent system 403. The log-in/out event may be agent 422 logging into call distribution system 401 via agent system 403 to begin handling calls for a work shift, logging out of call distribution system 401 at the end of a shift, indicating that agent 422 is going on a break, or any other type of event related to agent 422's ability to handle calls distributed by call distribution system 401.

In response to detecting the call log-in/out event, call distribution system 401 determines whether agent 422 should speak with supervisor 431. Supervisor 431, a call center administrator, or other user, may provide instructions as to when call distribution system 401 should determine that agent 422 should speak with supervisor 431. The instructions to call supervisor 431 may be a one-time instruction to call, an instruction to call multiple times, or may set forth a policy. The policy may be for specific agents or for all agents. For example, the policy may indicate that all agents should call the supervisor every day or every other day.

In this example, call distribution system 401 determines that agent 422 should speak with supervisor 431 in response to detecting the log-in/out event. Therefore, call distribution system 401 instructs agent system 403 to call agent system 406 so that agent systems 403 and 406 can exchange communications for agent 422 and supervisor 431. In some cases, call distribution system 401 may transfer information regarding agent 403 to agent system 406. The information may be presented to supervisor 431 for use during the call with agent 422. The information may identify the agent, provide statistics about the agent's job performance, indicate the agent's expertise, provide notes about past interactions with the agents, or any other information that may be useful to supervisor 431 when speaking with agent 422.

Once the call ends between agent systems 403 and 406, call distribution system 401 may begin to route calls between customer systems 409 and agent system 403 as part of its normal operation. Accordingly, agent 422 and supervisor 431 are forced to speak before agent 422 begins handling calls from customers. In some call centers, multiple supervisors may exist with each agent assigned to one or more supervisors. Thus, call distribution system 401 may be configured with instructions regarding to which supervisor each agent should be routed. In some cases, agents may be routed to a particular supervisor or may be routed to any one of multiple supervisors (e.g. whichever supervisor is available).

FIG. 6 illustrates an operational scenario 600 for contact center environment 400 to facilitate engagement with a plurality of agents in a contact center. Scenario 600 begins in much the same way as scenario 500 with call distribution system 401 detecting a log-in/out event from agent system 403 and determining whether agent 422 should speak with supervisor 431. However, in scenario 600, when agent system 403 initiates a call to agent system 406, agent system 406 indicates that system 406 is unavailable to accept the call. Agent system 406 may be unavailable because agent system 406 is currently connected on a call with another agent system, with one of customer systems 409, because agent 431 is currently logged out of agent system 406, or for some other reason. In some examples, call distribution system 401 may determine that agent system 406 is unavailable before initiating the call from agent system 403. For example, call distribution system 401 may query agent system 406 for availability before initiating the call with agent system 403 or may already know that agent system 406 is unavailable based on a call already having been routed by system 401 to agent system 406.

Once it is determined that agent system 406 is unavailable, call distribution system 401 places the call with agent system 403 into a call queue. The call queue may include other calls with other agent systems as well. For example, if a log-in/out event is detected for each of agent systems 402-405 at about the same time and each agent system 402-405 is to be connected to agent system 406, then 3 of the 4 agent systems will likely need to be placed in the queue since they will all call agent system 406 at about the same time. The queue may be a first in, first out queue or may be prioritized in some other way. When agent system 406 becomes available and agent system 403 is next in line out of the queue, then the call between agent system 403 commences.

In some examples, while agent system 403's call is in the call queue, agent system 403 may be routed calls with customer systems 409 by call distribution system 401. Then, when agent system 403 is next in line out of the queue, agent system 403 will be connected to agent system 406 when agent system 403 ends its current call with a customer system 409. This helps ensure that no productivity of agent 422 is lost while waiting to speak with supervisor 431. Alternatively, call distribution system 401 may select a later time in which to reattempt a connection between agent system 403 and agent system 406.

FIG. 7 illustrates an operational scenario 700 for contact center environment 400 to facilitate engagement with a plurality of agents in a contact center. In scenario 700, rather than connecting agent system 403 to agent system 406 so that agent 402 can speak with supervisor 431, agent system 402 is connected to automated response agent system 407 to provide pre-recorded information to agent 402 via the call with agent system 403. The information may be audible or visual depending on the capabilities of the agent systems and call distribution system 401. In some cases, the functionality of automated response agent system 407 may be incorporated into agent system 403. The pre-recorded information may be provided by supervisor 431, an administrator of call center 440, or some other person(s). For example, supervisor 431 may make a voice recording of call center goals for the day using agent system 406 that is provided to automated response agent system 407 and instructs call distribution system 401 to direct agent systems 402-405 to call automated response agent system 407 when agents 421-424 log in for their shifts.

In some examples, calls may be directed to automated response agent system 407 when agent system 406 is unavailable, as it was in scenario 600. Thus, even though some agents may not speak in real-time with supervisor 431, the agents are still provided with information from supervisor 431. Automated response agent system 407 may be able to provide the pre-recorded information to more than one agent system at one time. In additional examples, the agents may be provided with the information from automated response agent system 407 while waiting in the call queue of scenario 600.

FIG. 8 illustrates an operational scenario 800 for contact center environment 400 to facilitate engagement with a plurality of agents in a contact center. Scenario 800 is similar to scenario 700 in that call distribution system 401 determines that agent system 403 should be connected to automated response agent system 407. However, in scenario 800, automated response agent system 407 questions agent 422. The questions may be programed by supervisor 431, an administrator of call center 440, or by some other person(s).

Once agent system 403 is connected to automated response agent system 407, automated response agent system 407 transfers a first query to agent system 403 for presentation to agent 422. The question may be in audible or visual form depending on the capabilities of the agent systems and call distribution system 401. Agent 422 provides input into agent system 403 in response to first query. The input may comprise a voice response (e.g. if automated response agent system 407 is an automated voice response system), a press of one or more numbers on a dial pad, or some other means of input. That response is then transferred to automated response agent system 407. Subsequent queries, if any, are then transferred to agent system 403 from automated response agent system 407 and corresponding responses are returned until agent 422 has answered all of the queries. The subsequent queries may be chosen by automated response agent system 407 based on answers to prior queries. Agent 422's responses to the queries may be recorded individually or may be compiled with the responses from other agents. The responses may be accessible to supervisor 431, an administrator for call center 440, or some other person(s).

FIG. 9 illustrates an operational scenario 900 for contact center environment 400 to facilitate engagement with a plurality of agents in a contact center. In scenario 800, call distribution system 401 detects a log-in/out event from agent system 403 for agent 422. Call distribution system 401 then determines that agent 422 should speak with supervisor 431 at agent system 406. To avoid conflicts with other agents that are to speak with supervisor 431, call distribution system 401 schedules agent 422 for a specific time to speak with supervisor 431.

FIG. 10 illustrates agent engagement schedule 1000 in an example of the schedule that call distribution system 401 generates in scenario 900. As can be seen in schedule 1000, Agent 422 is scheduled to speak with supervisor 431 at 8:15 am. Call distribution system 401 may place agents in the schedule in the order that a log-in/out event was detected by call distribution system 401. Under that convention, log-in/out events for agents 421-424 were detected sequentially and scheduled in 15 minute increments. Other factors may also be considered when scheduling agents, such as each agent's calendar appointments, urgency of each agent to speak with supervisor 431 (as may be defined by supervisor 431), or otherwise. For example, agent 422 may have a meeting already scheduled at 8:30 and is therefore scheduled at 8:15 in schedule 1000. In some examples, schedule 1000 may be generated before detection of a log-in/out event. In those cases, detection of the event may serve to confirm that the agent is logged in and will be available at the scheduled time.

Referring back to scenario 900, when the time arrives that agent 422 is scheduled to speak with supervisor 431, a call between agent system 403 and agent system 406 is connected by call distribution system 401. In some examples, since agent system 403 may be connected to one of customer systems 409 while agent 422 speaks with a customer when the scheduled time arrives, agent system 403 may be connected to agent system 406 when that customer call ends so as not to interrupt. If that customer call goes longer than expected, then schedule 1000 may need to be reordered to accommodate agent 422 at another time.

Figure 11:
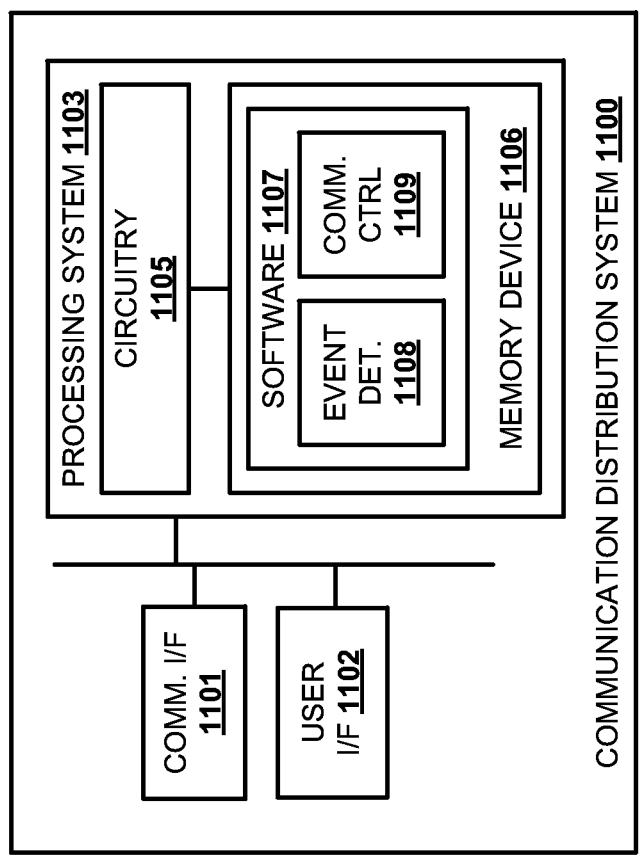
FIG. 11 illustrates a communication distribution system for facilitating engagement with a plurality of agents in a contact center.

FIG. 11 illustrates communication distribution system 1100. Communication distribution system 1100 is an example of communication distribution system 101, although system 101 could use alternative configurations. Communication distribution system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Communication distribution system 1100 may include other well-known components such as a battery and enclosure that are not shown for clarity. Communication distribution system 1100 may be a personal computer, tablet, application server, conferencing system, private branch exchange, or some other computing apparatus—including combinations thereof. In some examples, communication distribution system 1100 may be replicated across multiple locations in order to distribute the processing load required to function as described herein.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes information event detection module 1108 and communication control module 1109. Operating software 1107 may further include an operating system, utilities, drivers, network interfaces, applications, or some other type of software. When executed by processing circuitry 1105, operating software 1107 directs processing system 1103 to operate communication distribution system 1100 as described herein.

In particular, event detection module 1108 directs processing system 1103 to detect a log-in/out event for a first agent of the plurality of agents operating a first agent system of a plurality of agent systems to a communication distribution system configured to distribute communications with the contact center among the plurality of agent systems. Communication control module 1109 directs processing system 1103 to determine that the first agent system should communicate with a second agent system of the plurality of agent systems and to initiate a first communication between the first agent system and the second agent system.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of facilitating engagement with a plurality of agents in a contact center, the method comprising:
    detecting a log-in/out event for a first agent of the plurality of agents operating a first agent system of a plurality of agent systems to a communication distribution system configured to distribute communications with the contact center among the plurality of agent systems, wherein the log-in/out event comprises an event that indicates to the communication distribution system whether the first agent is available to accept communications;
    in the communication distribution system, responsive to the log-in/out event, determining that a first communication should be initiated between the first agent system and a second agent system of the plurality of agent systems operated by an agent supervisor under which the plurality of agents work; and
    in the communication distribution system, initiating the first communication between the first agent system and the second agent system.

2. The method of claim 1, wherein initiating the first communication occurs responsive to the detecting the log-in/out event and before any of the communications with the contact center are distributed to the first agent system.

3. The method of claim 2, further comprising:
    upon ending the first communication, connecting a first incoming communication of the communications with the contact center to the first agent system.

4. The method of claim 1, wherein determining that the first communication should be initiated comprises:
    scheduling times for a second agent of the plurality of agents operating the second agent system to communicate with each other agent of the plurality of agents.

5. The method of claim 4, wherein initiating the first communication occurs at a time scheduled for the first agent to communicate with the second agent.

6. The method of claim 1, further comprising:
    after initiating the first communication, determining that the second agent system is currently unavailable and, responsively, placing the first communication in a queue for the second agent system.

7. The method of claim 1, further comprising:
transferring a pre-recorded message from the second agent system to the first agent system over the first communication for presentation to the first agent by the first agent system.

8. The method of claim 1, wherein the second agent system comprises an interactive response system, and the method further comprising:
transferring queries from the second agent system to the first agent system for presentation to the first agent by the first agent system; and
in the second agent system, receiving responses to the queries from the first agent system, wherein the responses are based on user input from the first agent into the first agent system.

9. The method of claim 1, further comprising:
transferring information regarding the first agent to the second agent system for presentation to a second agent of the plurality of agents operating the second agent system in response to initiating the first communication.

10. The method of claim 1, further comprising:
recording information regarding an interaction between the first agent and a second agent of the plurality of agents operating the second agent system that occurs over the first communication.

11. A communication distribution system that distributes communications with a contact center among a plurality of agent systems, the communication distribution system comprising:
a processing system configured to detect a log-in/out event for a first agent of a plurality of agents operating a first agent system of the plurality of agent systems to the communication distribution system, wherein the log-in/out event comprises an event that indicates to the communication distribution system whether the first agent is available to accept communications, and, responsive to the log-in/out event, determine that a first communication should be initiated between the first agent system and a second agent system of the plurality of agent systems operated by an agent supervisor under which the plurality of agents work; and
a communication interface configured to initiate the first communication between the first agent system and the second agent system.

12. The communication distribution system of claim 11, wherein the communication interface is configured to initiate the first communication in response to the processing system detecting the log-in/out event and before any of the communications with the contact center are distributed to the first agent system.

13. The communication distribution system of claim 12, further comprising:
upon ending the first communication, the communication interface configured to connect a first incoming communication of the communications with the contact center to the first agent system.

14. The communication distribution system of claim 11, wherein the processing system configured to determine that the first communication should be initiated comprises:
the processing system configured to schedule times for a second agent of the plurality of agents operating the second agent system to communicate with each other agent of the plurality of agents.

15. The communication distribution system of claim 14, wherein the communication interface is configured to initiate the first communication at a time scheduled for the first agent to communicate with the second agent.

16. The communication distribution system of claim 11, further comprising:
after initiating the first communication, the processing system is configured to determine that the second agent system is currently unavailable and, responsively, place the first communication in a queue for the second agent system.

17. The communication distribution system of claim 11, wherein the second agent system transfers a pre-recorded message over the first communication to the first agent system for presentation to the first agent by the first agent system.

18. The communication distribution system of claim 11, wherein the second agent system comprises an interactive response system and wherein the second agent system transfers queries to the first agent system for presentation to the first agent by the first agent system and receives responses to the queries from the first agent system, wherein the responses are based on user input from the first agent into the first agent system.

19. The communication distribution system of claim 11, further comprising:
the communication interface configured to transfer information regarding the first agent to the second agent system for presentation to a second agent of the plurality of agents operating the second agent system in response to initiating the first communication.

20. The communication distribution system of claim 11, further comprising:
a storage system configured to record information regarding an interaction between the first agent and a second agent of the plurality of agents operating the second agent system that occurs over the first communication.

* * * * *